Patented Feb. 27, 1934

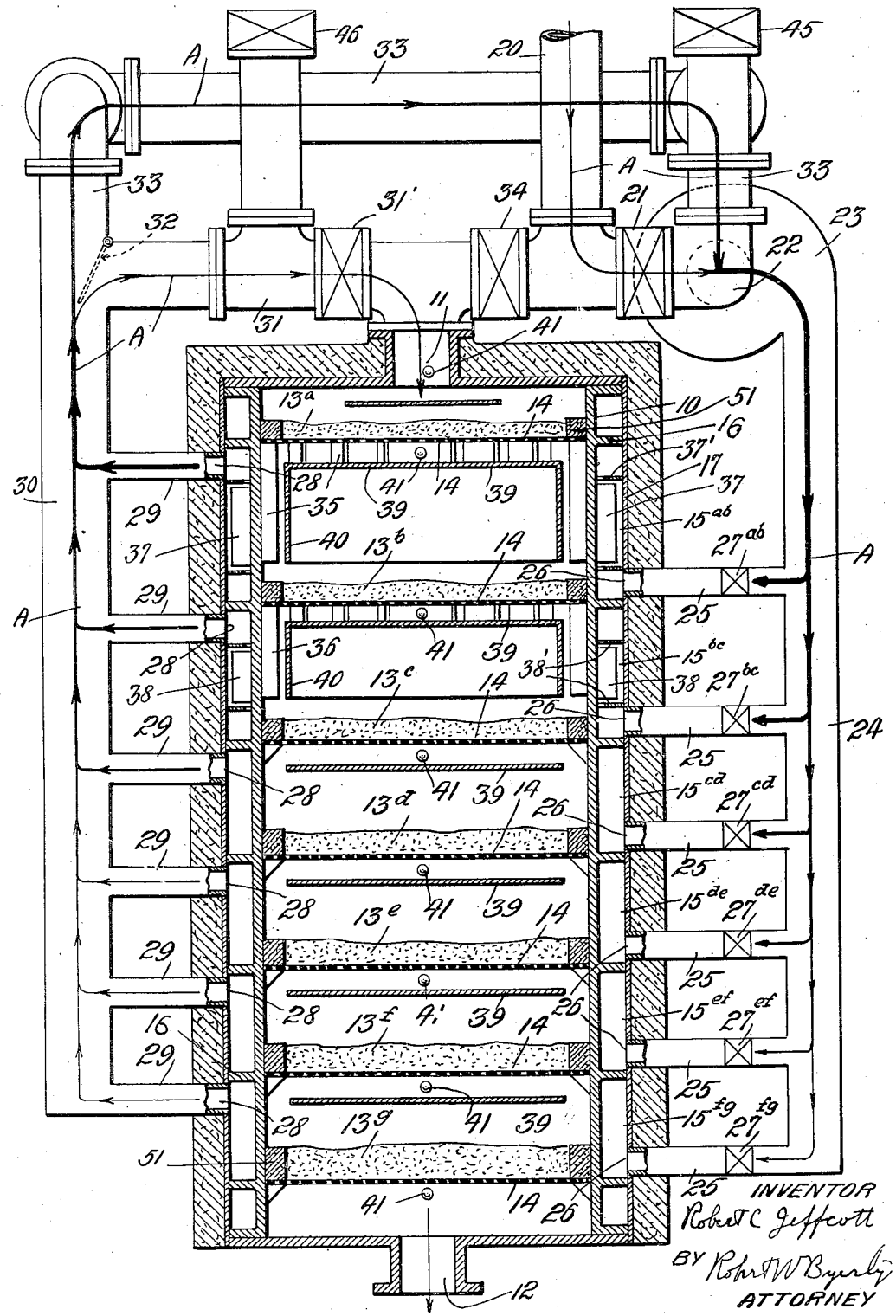

1,949,122

UNITED STATES PATENT OFFICE 1,949,122

APPARATUS FOR USE IN THE CATALYTIC OXIDATION OF GASES

Robert C. Jeffcott, Somerville, N. J., assignor to Calco Chemical Company, Inc., Bound Brook, N. J., a corporation of Delaware Application July 5, 1929. Serial No. 376,037

11 Claims. (Cl. 23—288)

This invention relates to apparatus for use in the catalytic oxidation of gases, and aims particularly to provide improved converter apparatus for use in the contact method of making sulphuric acid.

In the catalytic oxidation of sulphur dioxide to sulphur trioxide, the velocity of the reaction increases rapidly with increase of temperature, while, on the other hand, the percentage of conversion at equilibrium decreases with increase of temperature. In order to obtain both rapid and substantially complete conversion, it is desirable that the stream of gases be passed through the catalytic mass at a diminishing temperature, which at the initial contact of the gases with the catalytic mass is high enough to cause a rapid conversion, and at the final contact with the catalytic mass is low enough to cause a high percentage of conversion. Since the reaction creates heat, maintaining such a temperature gradient in the stream of gases passing through the catalytic mass requires the withdrawal of heat from the gas stream at progressively diminishing rates during the progress of the stream through the catalytic mass. To attain ideal conditions, the rate of the withdrawal of heat from the stream should be a diminishing logarithmic function of the flow of the gases through the catalytic mass.

The present invention provides a simple converter apparatus in which this ideal condition may be closely approximated in practice. In order to illustrate the invention, I will describe in detail the embodiment of it in a converter of the type in which the stream of gas is passed successively through separated catalytic masses supported on foraminous trays in the converter. Such an embodiment of the invention is illustrated in the accompanying drawing which shows a tray converter structure in section, and illustrates diagrammatically the piping associated therewith.

The apparatus shown in the drawing includes a converter 10 which may conveniently take the form of a cylindrical casing forming a vertical conduit through which the gases to be converted flow downward from an inlet opening 11 to an outlet opening 12. A series of separated catalytic masses 13a, 13b, etc. are supported on foraminous trays or screens 14 in the converter 10 in such manner that the gases pass through all the masses in series.

Means are provided for withdrawing heat at progressively diminishing rates from the vertical stream of gases passing through the converter. The heat is withdrawn from the gas stream through the walls of the converter by means of cooling gas flowing through horizontal cooling conduits surrounding different parts of the outer wall of the converter. In the construction illustrated, the cooling conduits take the form of separate annular chambers 15ab, 15bc, etc. surrounding the portions of the wall of the converter between the screens supporting the catalytic masses 13a and 13b, 13b and 13c, etc. The annular chambers may be formed by external flanges 16 projecting from the converter wall on a level with the screens 14 and an outer casing 17.

Means are provided for causing a cooling gas to flow through each of the annular chambers, and for separately regulating the rate of flow of said gas through each individual chamber. I found that the necessary temperature regulation may best be effected by causing the cooling gas to flow through the annular chambers with great rapidity, and, that, in order to make use of a rapid flow without excessive cooling at any point, I provide means whereby the cooling gas may be maintained at a super-atmospheric temperature. The drawing illustrates an arrangement by means of which the cooling may be accomplished by the gases to be converted or by a separate cooling medium such as air. The course of the cooling medium through the annular chambers is indicated in the drawing by the lines A whose width roughly approximates the volume of gas flowing in each part of the circuit in a unit of time.

If the gases to be converted are used as the cooling medium, the gases enter through a pipe 20, and pass through a valve 21 into an intake 22 of a blower 23. The blower forces the gases into a manifold 24 which communicates by separate pipes 25 with the intake openings 26 of the separate annular chambers. The rate of flow of the gases into the separate chambers 15ab, 15bc, etc. is controlled by separate valves 27ab, 27bc, etc. From the outlet openings 28 of the annular chambers, the gases pass through separate pipes 29 into a manifold 30. At the upper end of this manifold, the stream of gases divides, a part passing through a pipe 31 and a valve 31' into the intake opening 11 of the converter, and a part passing through piping 33 and to the intake of the blower 23 to be recirculated through the annular chambers. By regulating the speed of the blower 23 and the position of a damper 32 located at the point where the stream of gases divides, the proportion of the stream recirculated may be regulated while the gas flowing into the converter through the pipe 31 is maintained equal to the gas supplied through the pipe 20. The arrangement described provides for recirculating rapidly a large body of gases through the annular chambers 15ab and 15bc, etc. in parallel, while continually adding to the circulating gases a supply of the gases to be converted, and continually withdrawing from the gases which have passed through the annular chambers an equal amount to be passed into the converter.

It will be understood that, as in the case of other regenerative converters, the use of the gases to be converted as the cooling medium serves at the same time to pre-heat these gases before they are introduced into the converter, so that the gases may be supplied through the pipe 20 at a temperature much lower than that at which the gases must be introduced through the converter inlet 11, and the total cooling may be accurately determined by the supply temperature.

While the converter apparatus which has been described is adapted for obtaining these advantages of regenerative cooling, it may be operated with the use of a separate cooling gas, such as air, which has the advantage of requiring less heat transfer surface in the converter, since the separate cooling gas need not leave the cooling chambers at a temperature as high as that at which the gases to be converted must be introduced through the inlet 11. To permit such operation, a valve-controlled air inlet 45 is provided in the piping 33, and a valve-controlled air outlet 46 is provided in the pipe 31. To make use of air cooling, it is necessary only to open the air valves 45 and 46 and to close the valves 21 and 31'. In this case, a valve 34 is opened to admit the gases to be converted from the pipe 20 directly to the inlet 11 of the converter. The damper 32 may be adjusted to prevent recirculation or to provide for recirculation of any desired portion of the cooling stream.

In the operation of the device, a decreasing temperature is maintained in the stream of gases flowing through the converter extending from above 550° C. when in contact with the first mass 13a to about 440° C. when in contact with the final mass 13g. This is accomplished by giving the successive annular chambers 15ab, 15bc, etc., a progressively diminishing cooling effect, the cooling effect or rate of withdrawal of heat by the successive chambers being approximately as follows:

Chamber 15ab_____ 100
Chamber 15bc_____ 50
Chamber 15cd_____ 30
Chamber 15de_____ 25
Chamber 15ef_____ 20
Chamber 15fg_____ 15

This difference in cooling effect is obtained by adjusting the valves 27ab, 27bc, etc., so as to cause a much more rapid flow of the cooling gas through the upper chambers than through the lower chambers. Special means are also provided for increasing the cooling effect of the two upper chambers 15ab and 15bc. These consist in heat-absorbing fins 35, 36 projecting inwardly from the walls of the converter between the masses 13a and 13b and between masses 13b and 13c, and heat-radiating fins 37, 38 projecting from the wall of the converter into the annular chambers 15ab and 15bc. An even flow of the gas between and along the fins 37, 38 is secured by annular baffle plates 37', 38' in the chambers 15ab, 15bc. Baffles 39 are provided under each screen 14 to bring the stream of gases into contact with the cooling wall of the converter during its flow between the successive masses, and the baffles immediately below the masses 13a and 13b are provided with depending skirts 40 to bring the stream of gases into intimate contact with the heat-absorbing fins 35, 36. Furthermore, the extraction of heat between the masses 13a and 13b is increased beyond that between the masses 13b and 13c by spacing the masses 13a and 13b further apart than the masses 13b and 13c, while the masses below the mass 13c are still closer together than the masses 13b and 13c.

To provide for maintaining the desired ratio of heat removal from the different parts of the gas stream, pyrometers 41 are introduced in the converter between each pair of masses, in order to guide the operator in the separate adjustment of the valves 27ab, 27bc, etc.

To assist in maintaining the desired temperature and in maintaining the cooling stream at a super-atmospheric temperature, so that a rapid flow of the cooling stream may be used, the entire converter and the annular cooling chambers are provided with heat insulation 50, and the pipes may also be provided with heat insulation.

To prevent a cooling of the catalytic masses by the cooling wall of the converter, the periphery of each mass is separated from the wall of the converter by means of fire bricks 51 or other heat insulation.

I wish it clearly understood that my invention is by no means limited to the specific apparatus which has been described. The accurate control of the temperature of the gas stream provided by my invention is of especial value during the latter stages of the conversion, and the invention may, therefore, advantageously be used in converters supplied with partially converted gases as well as in those supplied with wholly unconverted gases.

What I claim is:

1. In apparatus for the catalytic oxidation of gases, a converter, a plurality of separated catalytic masses arranged in series in the converter, separate heat-absorbing ribs extending inwardly from the portions of the wall of the converter between different pairs of adjacent masses, corresponding separate heat-radiating ribs extending outwardly from said portions of the wall of the converter, means providing separate annular chambers surrounding said separate external ribs, and separately regulatable means for circulating cooling gas in said chambers.

2. In apparatus for the catalytic oxidation of gases, a converter having inlet and outlet openings, a plurality of separated catalytic masses arranged in series in said converter between said openings, means providing separate annular chambers surrounding the portions of the wall of said converter between each pair of adjacent masses, means for passing a cooling gas through said annular chambers, and radiating ribs projecting only from the portions of the wall of the converter which are within the annular chambers near the inlet opening of the converter.

3. In apparatus for the catalytic oxidation of gases, a cylindrical casing having inlet and outlet openings at its opposite ends, a plurality of foraminous trays mounted in said casing, a mass of catalytic material supported on each of said trays, baffling means between said trays for causing gases after passing through each catalyst layer, to be deflected outwardly into contact with the converter casing between the trays, means providing separate annular chambers surrounding the zones of the outer wall of said cylindrical casing located between pairs of said trays, separate inlet conduits, one entering the outer wall of each annular chamber near the bottom of the chamber, a plurality of outlet conduits, one leading from the outer wall of each annular chamber near the top of the chamber, means for causing a cooling medium to flow through said inlet conduits into said chambers and out through said outlet conduits, and separate means for regulating the rate of flow of the cooling medium through each annular chamber, so that the heat withdrawn through the cylindrical casing of the converter between each pair of catalytic masses may be separately regulated.

4. In apparatus for the catalytic oxidation of gases, a converter comprising a casing having inlet and outlet openings at its opposite ends, a plurality of foraminous trays supported in said casing, a plurality of spaced catalytic masses supported on said trays, baffling means between said trays for causing gases after passing through each catalyst layer, to be deflected outwardly into contact with the converter casing between the trays, means providing a plurality of transverse flow passages, each of which surrounds the outer wall of the casing between a different pair of said trays, means for causing the cooling medium to flow through each of said transverse flow passages, and separate means for regulating the rate of flow of said cooling medium through each of said passages, so that the amount of heat withdrawn from the portions of the wall of the casing surrounded by said separate passages may be separately regulated.

5. In apparatus for the catalytic oxidation of gases, a converter comprising a casing having inlet and outlet openings at opposite ends thereof, a plurality of foraminous trays supported in said casing, spaced catalytic masses resting on said trays, baffling means between said trays for causing gases after passing through each catalyst layer, to be deflected outwardly into contact with the converter casing between the trays, separate means for withdrawing heat from each of the zones of the outer wall of the casing between each pair of trays, and separate means for regulating the amount of heat withdrawn from each such zone of the outer wall.

6. In apparatus for the catalytic oxidation of gases, a converter comprising a casing having inlet and outlet openings at opposite ends thereof, a plurality of foraminous trays supported in said casing, spaced catalytic masses resting on said trays, baffling means between said trays for causing gases after passing through each catalyst layer, to be deflected outwardly into contact with the converter casing between the trays, separate means for withdrawing heat from each of the zones of the outer wall of the casing between each pair of trays, separate means for regulating the amount of heat withdrawn from each such zone of the outer wall, and means for preventing direct withdrawal of heat from the catalytic masses through the wall of the casing.

7. In apparatus for the catalytic oxidation of gases, a converter consisting of a casing having inlet and outlet openings at opposite ends thereof, a plurality of foraminous trays in said casing, separate catalytic masses resting on said trays, baffling means between said trays for causing gases after passing through each catalyst layer, to be deflected outwardly into contact with the converter casing between the trays so that the gases to be converted pass through said masses in succession, and are heated in each mass by the oxidation caused by the catalytic effect of that mass, and means for withdrawing from the annular zone of the outer wall of the casing between each mass and the next mass an amount of heat greater than that created in said preceding mass.

8. In apparatus for catalytic oxidation of gases, a converter comprising a casing having inlet and outlet openings at its opposite ends, three foraminous trays supported in said casing, the middle tray of which is spaced at unequal distances from the adjoining trays, a mass of catalytic material on each of said trays, a relatively high transverse flow conduit surrounding the outer wall of the casing between two of said trays, and a relatively low flow conduit surrounding the portion of the outer wall of the casing between the other two of said trays, and means for flowing a cooling medium through said transverse conduits.

9. In apparatus for catalytic oxidation of gases, a converted comprising a casing having inlet and outlet openings at its opposite ends, three foraminous trays in said converter, a separate catalytic mass on each of said trays, baffling means between said trays for causing gases after passing through each catalyst layer, to be deflected outwardly into contact with the converter casing between the trays, a transverse flow conduit surrounding the portion of the outer wall of said casing between the middle tray and one of the other trays, a separate transverse flow conduit surrounding the outer portion of the wall casing between the middle tray and the other tray, means for causing a cooling medium to flow through said transverse conduits, and means for conducting heat through the portion of the wall surrounded by one of said conduits more rapidly than heat is conducted through the portion of the wall surrounded by the other of said conduits.

10. An apparatus according to claim 5 in which at least one of the baffling means consists in a horizontal baffle extending nearly in the casing and a vertical skirt depending from the edge of said baffle and forming with the converter wall an annular space of narrow cross section relative to the cross section of the converter.

11. An apparatus according to claim 6 in which at least one of the baffling means consists in a horizontal baffle extending nearly in the casing and a vertical skirt depending from the edge of said baffle and forming with the converter wall an annular space of narrow cross section relative to the cross section of the converter.

ROBERT C. JEFFCOTT.